United States Patent [19]
Scheinkman et al.

[11] Patent Number: 5,848,424
[45] Date of Patent: *Dec. 8, 1998

[54] DATA NAVIGATOR INTERFACE WITH NAVIGATION AS A FUNCTION OF DRAGGABLE ELEMENTS AND DROP TARGETS

[75] Inventors: Luiz Scheinkman, San Jose; Shai Agassi, Cupertino, both of Calif.

[73] Assignee: TopTier Software, Inc., San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 751,779

[22] Filed: Nov. 18, 1996

[51] Int. Cl.$^6$ .................................................. G06F 17/21
[52] U.S. Cl. ........................... 707/501; 345/335; 345/347
[58] Field of Search .................................... 395/761–762, 395/335, 338, 346–347, 356–357, 354, 774, 200.33, 200.48; 345/335, 338, 346, 347, 354; 707/500, 501, 513, 515

[56] References Cited

U.S. PATENT DOCUMENTS

| | | | |
|---|---|---|---|
| 5,416,900 | 5/1995 | Blanchard et al. | 395/346 |
| 5,416,901 | 5/1995 | Torres | 395/348 |
| 5,434,965 | 7/1995 | Matheny et al. | 395/338 |
| 5,481,666 | 1/1996 | Nguyen et al. | 395/357 |
| 5,500,929 | 3/1996 | Dickinson | 345/356 |
| 5,546,521 | 8/1996 | Martinez | 395/338 |
| 5,572,643 | 11/1996 | Judson | 395/200.48 |
| 5,630,080 | 5/1997 | Malamud et al. | 395/346 |
| 5,649,186 | 7/1997 | Ferguson | 395/610 |
| 5,668,857 | 9/1997 | McHale | 379/93.07 |

OTHER PUBLICATIONS

Tsuda et al., Iconic Browser: An Iconic Retrieval System for Object–Oriented Databases, IEEE Workshop on Visual Languages, pp. 130–137, Dec. 1989.

*Primary Examiner*—Joseph H. Feild
*Attorney, Agent, or Firm*—Philip H. Albert; Townsend and Townsend and Crew LLP

[57] ABSTRACT

A hypertext browser displays hypertext pages and indicates draggable elements on the page being viewed. The browser also displays drop targets and detects when a user selects a draggable element and drops the draggable element within a drop target. The browser and/or the server to which it is connected examine a class relation matrix having entries for intersections of draggable element references and drop target references in which a matrix entry at an intersection of the draggable element and drop target is identified and used for performing an action which is a function of the matrix entry.

12 Claims, 7 Drawing Sheets

FIG. 5

Relation Editing

From obj: MACT

To obj: MCTY

| # | < | obj1 | prop1 | op | obj2 | prop2 | /Literal | > | Next |
|---|---|------|-------|----|------|-------|----------|---|------|
| 1 |   | MACT | set_Name | = | MLKA | set_Name |  |  | AND |
| 2 |   | MLKA | club_Name | = | MCLB | club_Name |  |  | AND |
| 3 |   | MCLB | country | = | MCTY | country |  |  |  |

Cancel    Ok

FIG. 6

DATA NAVIGATOR INTERFACE WITH NAVIGATION AS A FUNCTION OF DRAGGABLE ELEMENTS AND DROP TARGETS

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates to the field of data navigation. More specifically, one embodiment of the invention provides a user with an improved method and apparatus for navigating through complex databases.

The current navigation metaphor on the World Wide Web (as well as other, less popular hypertext document "webs") is that of jumping from one page to another by pointing and clicking on highlighted words or icons (anchors) which point to other locations in the hypertext document (links). Current browsers operate under the HTML (HyperText Markup Language) view of the world. In the HTML view, anchors with links are interspersed throughout a page and are more or less fixed when the page is authored, which might be some time before the page is viewed and would be the same page for each reader. In this model, a link is inherently limited to pointing towards a single location, namely the destination described by the URL (Uniform Resource Locator) pointed to by the link. A new generation of HTML employs multiple scripting extensions to HTML (such as CGI, JavaScript and others) to allow execution of code based on the anchor clicked on by the user, but still the only links a browser user can follow are those preconceived by the author, and the user has no flexibility in browsing beyond those links.

Since all the links must be preconceived, often the author of a page will create a page, with its fixed links, and the page will be obsolete when the "linked-to" pages change. Furthermore, if sites rely on a large content base which is constantly changing, site creators need to constantly keep maintaining the integrity of their information. This problem has been recognized, and solutions have been proposed, but none have been entirely satisfactory. For example, a database could be integrated with an HTTP (HyperText Transport Protocol) server, where the database is passed though a set of templates to create a static snapshot of the current state of the database. Another approach is to embed explicit code and database calls inside HTML pages creating, in effect, a distributed program embedded inside a myriad of web pages. Both approaches have proven to be very time consuming and costly solutions during day-to-day maintenance.

The current navigation model is also limited to simple navigation metaphors (e.g., point and click) and does not provide the ability to relate locations without creating a pointing link from one to the other.

From the above, it is seen that an improved hypertext navigation system for browser users is needed.

SUMMARY OF THE INVENTION

An improved hypertext navigation system is provided by virtue of the present invention. In one embodiment of a hypertext browser according to the present invention, the browser displays hypertext pages and indicates draggable elements on the page being viewed. The browser also displays drop targets and detects when a user selects a draggable element and drops the draggable element over a drop target. The browser and/or the server to which it is connected examine a class relation matrix having entries for intersections of draggable element references and drop target references in which a matrix entry at an intersection of the draggable element and drop target is identified and used for performing an action which is a function of the matrix entry.

In a more general model, each of the draggable elements and drop targets are "atoms" or objects which are describable as a unit in a protocol for conveying meta-data references. In this model, any atom that has at least one output is a draggable element and any atom that has at least one input is a drop target. Thus, some atoms can be both draggable elements and drop targets. The communication of data from an atom output to an atom input can be effected by using meta-data object references in a distributed object system. A class relation matrix is used to specify how the output of the dragged atom is to be converted, if at all, into a form acceptable to the input of the drop target atom. A server handling these communications has a class relation matrix relating some objects. Where the input atom and output atom are not both objects known and related at the server, the server refers to external object registries to relate the input atom to the output atom, either directly or indirectly through an intermediate object.

A further understanding of the nature and advantages of the inventions herein may be realized by reference to the remaining portions of the specification and the attached drawings.

BRIEF DESCRIPTION OF THE DRAWINGS

FIG. 5 is a screen shot of a program used to view and edit relationship types for a class relation matrix.

FIG. 6 is a screen shot of a program used to view and edit relationships between classes in a class relation matrix.

DESCRIPTION OF THE PREFERRED EMBODIMENTS

The preferred embodiment is described herein and shown in the figures as an embodiment of a computer system running the Macintosh® operating system on a Macintosh® computer manufactured by Apple Computer, of Cupertino, Calif. and running the Netscape Navigator™ Web browser developed by Netscape Corporation of Mountain View, Calif. where the computer is coupled to the global internetwork of networks known as the "Internet" using a TCP/IP (Transport Control Protocol/Internet Protocol) interface.

However, it should be noted that other computers, operating systems and networks are ready equivalents for those elements.

The example application shown in the figures is a hypertext system for browsing (or "surfing") through a database of resorts and vacation clubs. Unlike a conventional browser, which presents pages as pregenerated by an author at a server site or as dictated by a database structure at the server site, a user of the browser can navigate through the data in ways only contemplated by the user. This is made possible by the extension of the concept of URL's to include references in a novel protocol referred to herein as the "Know" protocol, whose description is set out in Appendix B. Using this protocol, objects are described by what they represent ("meta-data") rather than what they are or what their values are (data). This provides for an object-oriented navigation paradigm which provides for the greater flexibility of the system.

Most conventional browsers allow for modifications, in the form of "plug-ins", "add-ons" or the like. Where a browser is modified to handle meta-data in the Know protocol, it might be described as a "Mediator-enabled" browser. Where a server is modified to respond correctly to Know protocol messages sent by a Mediator-enabled browser, the server is said to be a "Mediator-enabled" server.

Figure 1:
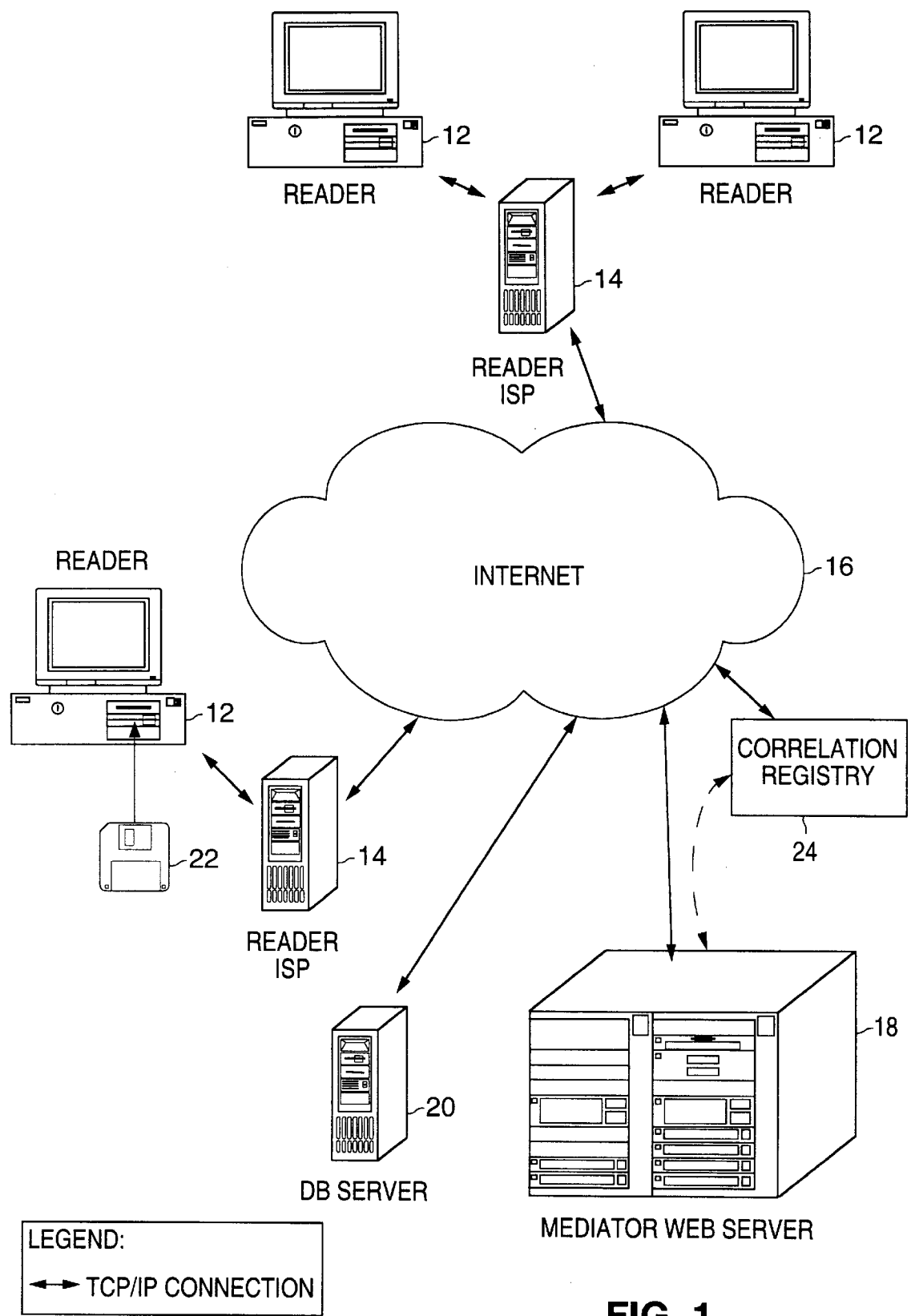
FIG. 1 is a schematic diagram of a network over which the present invention might be used.

This embodiment of the data navigation interface is shown in the figures. FIG. 1 is a schematic of a network over which the invention might operate. To access content, a reader 12 connects to a reader ISP (Internet Service Provider) 14, which in turn connects reader 12 to the Internet 16 as is well known in the art. Other network connections are also possible. Also shown connected to Internet 16 in addition to readers 12 and reader ISP's 14, are a Web server 18, which is a "Mediator-enabled" server as described below, and a database (DB) server 20. Readers 12 are also referred to herein as "browsers" because they can be used by a user to browse the Web. Of course, readers 12 could also be machines totally controlled by programs acting as users as opposed to being controlled by human users. One reader 12 is shown with a client-side program 22 loaded thereon from a magnetic media. Client-side program 22 provides the novel functionality described below.

Although not shown, readers 12 include graphical displays and input devices such as a mouse and/or keyboard. As is well known in the art of user interfaces, the input devices can be used to manipulate a cursor, such as a mouse cursor, on the graphical display to select screen elements.

Figure 2:
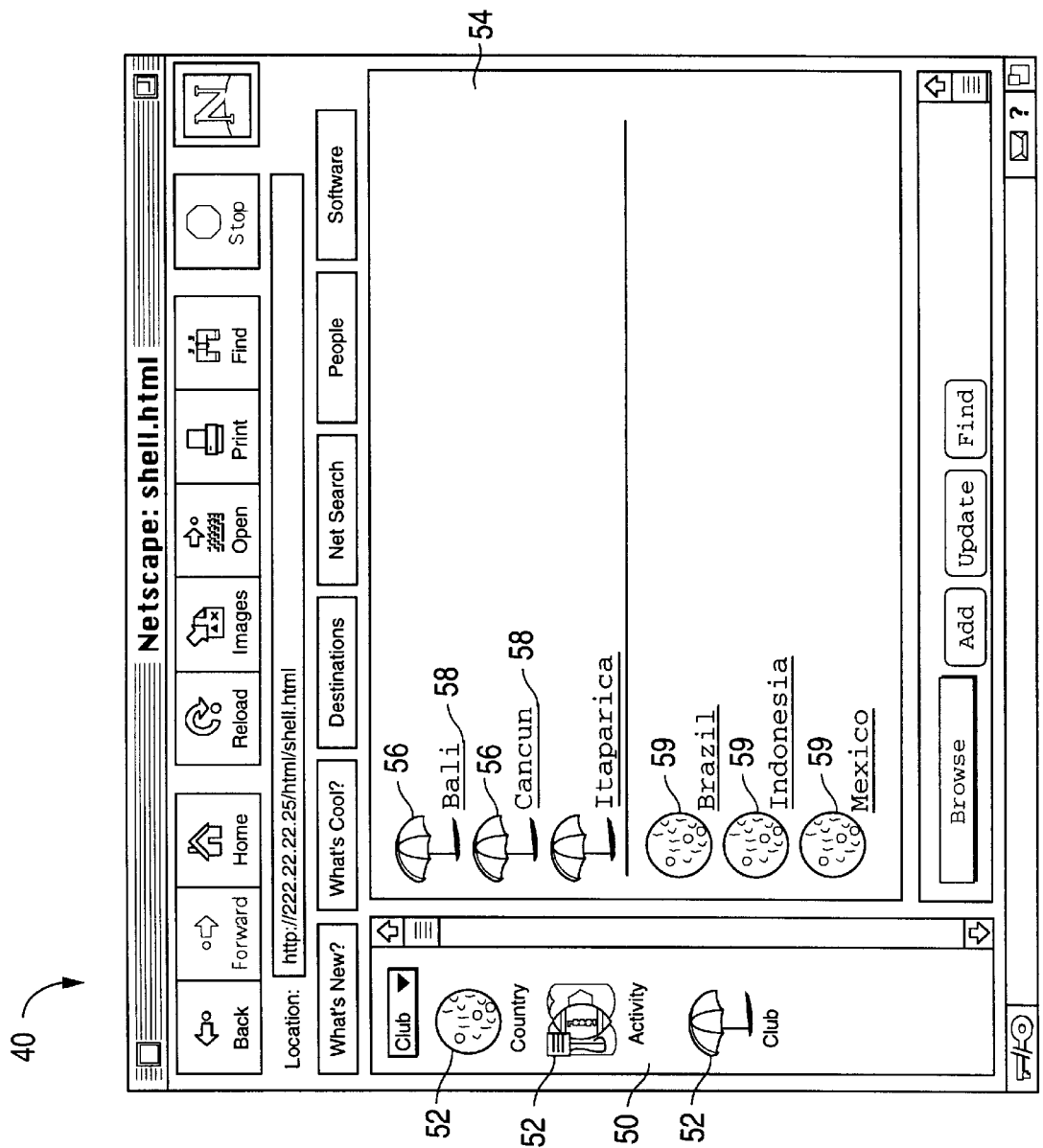
FIG. 2 is a screen display showing elements of the present invention.

Referring now to FIG. 2, a view 40 of a graphical display is there shown. View 40 results from running a Netscape Navigator browser with a plug-in to modify its behavior as described herein to be a Mediator-enabled browser. The Mediator-enabled browser display shown in FIG. 2 includes a toolbar 50 containing one or more drop target atoms 52 which are represented by object icons. The browser displays a page 54 to the left of toolbar 50. That page 54 includes draggable atoms, represented by icons 56 or anchors 58. These atoms 52, 56, 58 represent classes of objects, processes, or instances of data. Typically, toolbar 50 will change depending on what server the browser is currently connected to. Toolbars show atoms which may be located on Web server 18, other servers, or a correlation registry 24 which correlates seemingly unrelated atoms. In addition to the atoms provided by Web server 18, toolbar 50 might also include "bookmark" atoms from elsewhere.

Generally speaking, each draggable icon 56 or anchor 58 represents an instance of a certain class, or an atom. Those atoms may be marked with self descriptive meta-data. Anchors 58 are either formatted as conventional links or as links specified in the "Know" protocol used by the preferred embodiment. Know protocol links might be shown by a special font or color. When the user moves the mouse over the anchor, the relevant information denoted by the anchor is displayed in a status bar at the bottom of the screen (see FIG. 4).

A Mediator-enabled browser is capable of operating as an ordinary browser when encountering an ordinary Web site, but as the user points the browser towards Web server 18 (or any other Mediator-enabled Web server), the browser connects to Web server 18 and can communicate using Know protocol messages. The home page for the site hosted on Web server 18 (or the page referenced) will include an "embed" statement which points to a Mediator plug-in. For example, if Web server 18 has a host IP address of 222.22.22.25 and the browser navigates to the root directory of that host, Web server 18 will return a home page which includes the following text snippet:

<EMBED SRC="club.atom" WIDTH=40 HEIGHT= 1000 TARGET="Desktop" OPEN="default.htmll"> indicating that the Mediator plug-in (from media 22 or another source) should be loaded. If not found, the browser will be pointed to a download site to automatically download a Mediator plug-in. The snippet above gives a file name of the atom to be presented, "club.atom", which is then loaded. An example of the club.atom file is shown in Table 1.

TABLE 1

```
//File: Club.atom
//Description: Atom specifier for the Club site
//
//Toolbar Name
@Clubs
```

| //Atom | Name | Server ID | Atom URL | Icon | MainObj |
|---|---|---|---|---|---|
| 25007 | Country | 222.22.22.25 | club/Atom/25007 | Country.Pic | MCTY |
| 25008 | Activity | 222.22.22.25 | club/Atom/25008 | Activity.Pic | MACT |
| 25012 | Club | 222.22.22.25 | club/Atom/25012 | Club.Pic | MCLB |

```
//Toolbar Name
@AAir
```

| //Atom | Name | Server ID | Atom URL | Icon | MainObj |
|---|---|---|---|---|---|
| 25024 | Flight | 134.45.22.10 | amer/Atom/25024 | Flight.Pic | AFLT |
| 25025 | Airport | 134.45.22.10 | amer/Atom/25025 | Airport.Pic | APRT |
| 25028 | Price | 134.45.22.10 | amer/Atom/25028 | Price.Pic | APRC |

The data in the atom file club.atom is loaded by the browser and used to construct toolbar 50. At this stage, the user is ready to interact with the site in any of several ways. For example, if the user double-clicks on an atom in page 54, the browser passes the double-click event to the plug-in. The plug-in identifies the clicked atom and gets the URL it points to. Using the URL retrieved from the atom, the plug-in sends the appropriate Know protocol message to the server identified in the atom file for that atom. An example of a Know protocol message is:

http://222.22.22.25/.MEDIATOR$*MEDIATOR*NST/
     club/Atom/25012 where the message structure is:

http://<HostID>/.MEDIATOR$*MEDIATOR*NST/
     <Obj_Model>/Atom/<Atom_ID>.

Figure 3:
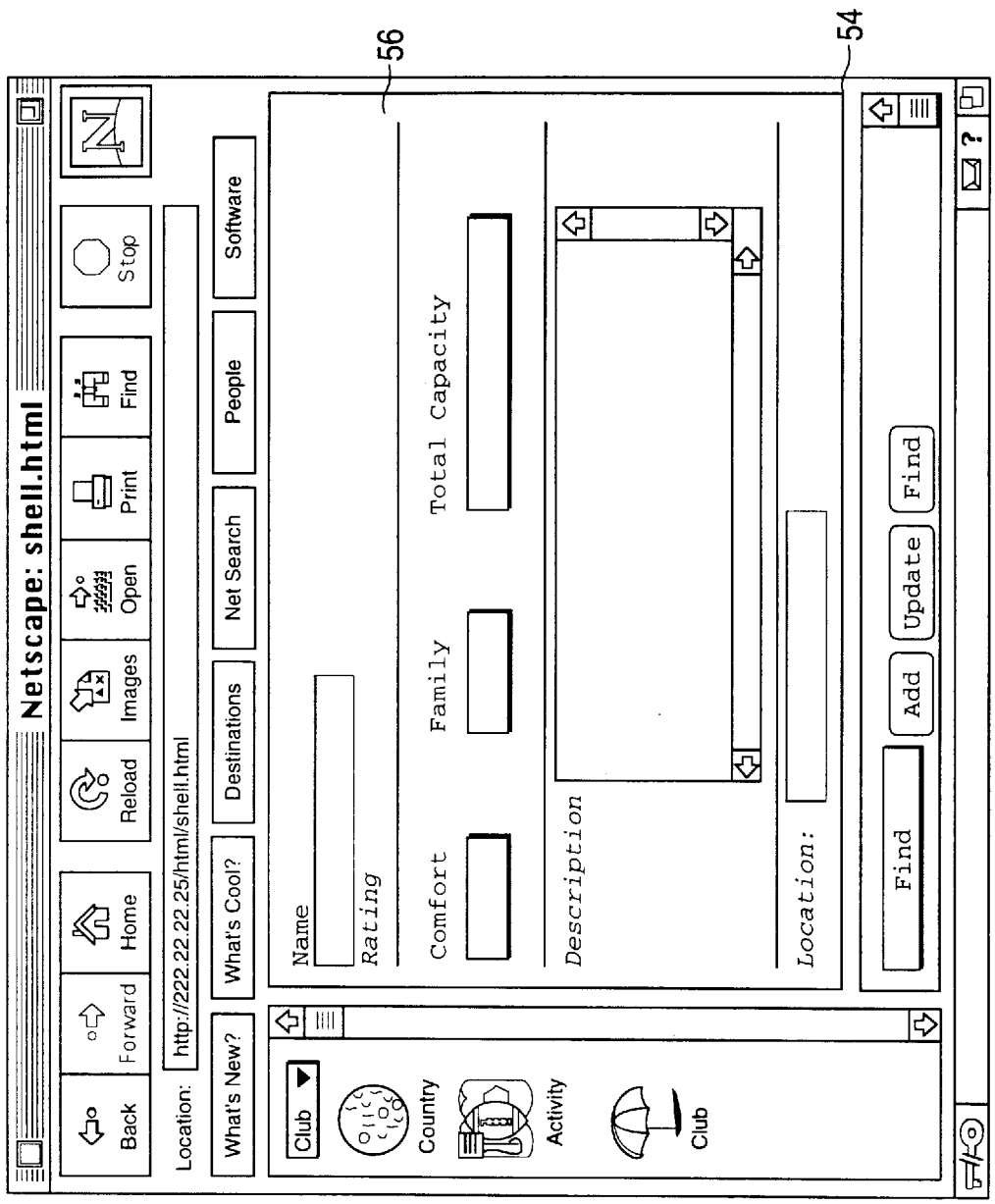
FIG. 3 is a screen display illustrating how a page might appear in a browser programmed according to the present invention.

In response, the server 222.22.22.25 returns a "Find" Template for the atom. An example of a find template is shown in Appendix A.1. This template can be displayed as an HTML form in window 54, as shown in FIG. 3. The page 56 shown therein contains hidden meta-data descriptors associated with each of the search fields. These descriptors are shown in Appendix A.1. The user uses this form to create a search to an atom meeting the specified criteria. The browser sends the search parameters to the server related to the atom being searched.

The atom's server performs the search query by loading atom code and translating the search request into queries which are sent to DB server 20. DB server 20 performs the queries and returns a collection of records which are relevant to the queries. The atom's server then translates the resulting records into an HTML page using the template shown in Appendix A.2. That page includes a list of records with associated meta-data Know protocol descriptors, which are hidden from the user. However, as shown in FIG. 4, an individual descriptor 60 for a record such as the record 62 pointed to by cursor 64 can be viewed on a status line.

Figure 4:
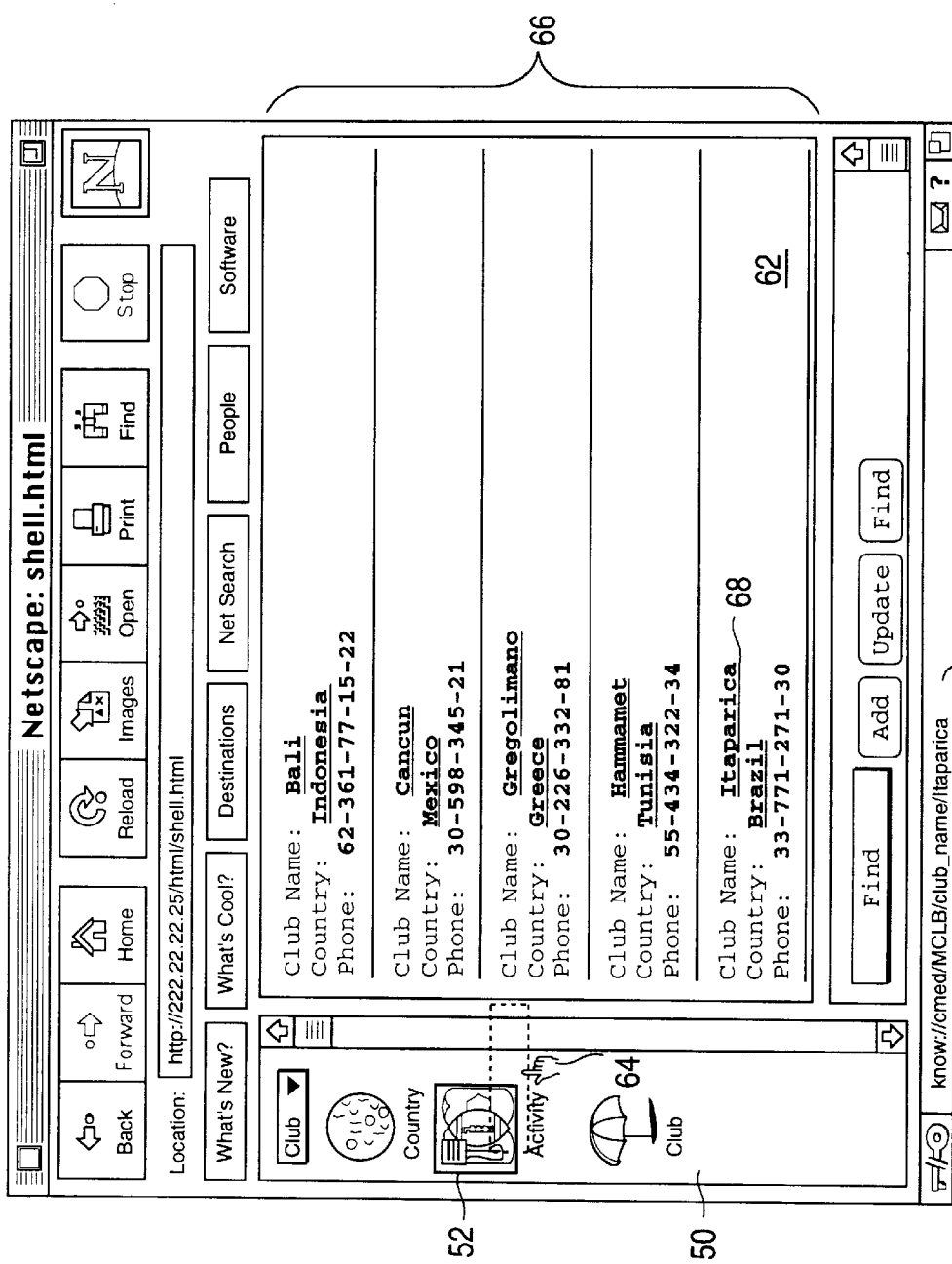
FIG. 4 is a screen display illustrating meta-data references, draggable element atoms and drop target atoms and shows a draggable element atom being dropped over a drop target atom.

With the list in FIG. 4 displayed, the user can drag and drop an anchor from page 66 onto one of the atoms 52 on toolbar 50, to create a drag-and-drop event matching the anchor to the atom. In particular, the dragging of link 68 over atom 52 results in the drag-and-drop event which is described in the Know protocol by the string:

Drag Event = OpenURL
MessageType = 'Type'
EventMessage = http://222.22.22.25/.MEDIATOR$*MEDIATOR*NST
/cmed/Atom/25008<cmed/MCLB/club_name/Itaparica The general structure for a message for this event is:

HTTP://<Host_ID>/.MEDIATOR$*MEDIATOR*NST/<Obj_Model>/Atom/
<Atom_ID>'<'<Obj_Model>/<Object>/<Property_ID>/<Prop_Value>

Figure 5:
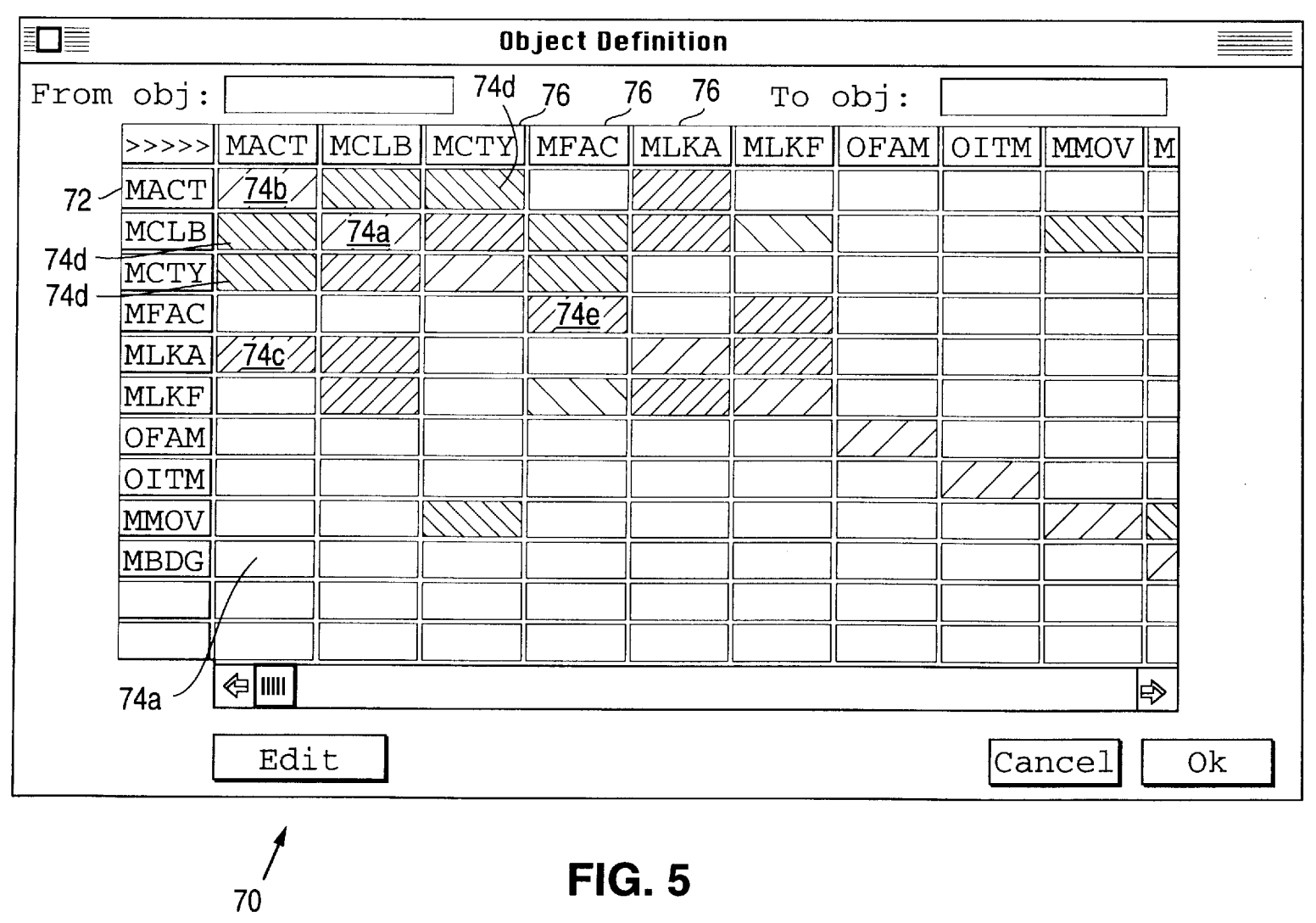

The browser sends this message to the identified server, which is Mediator-enabled. That server performs an object class translation from the dragged atom's data to data which the drop target atom is willing to accept. The translated data is then passed to the drop target atom as input for its action. Translation is done using a matrix such as matrix 70 shown in FIG. 5. Down the left side of matrix 70 are labels 72 listing the draggable element atoms. Across the top of matrix 70 are labels 76 listing the drop target atoms. At each intersection of a draggable element and a drop target, a class relation type 74 is stored. Class relation types 74 are one of the following types:

74a—No relation
74b—Null relation
74c—Simple relation
74d—Complex relation
74e—Interclass relation Where no relation is indicated (74a), the server will look to a correlation registry to find a relation between the dragged element and the drop target.

FIG. 6 shows is view of the relation between two atoms (classes), namely the dragged element atom "MACT" and the drop target atom "MCTY". This relation is a complex relation (74d) in that there are several intermediate steps between relating these two atoms together, e.g., filtering through the "MLKA" and "MCLB" atoms. Therefore, if the user were to select a draggable element "MACT" (the "activity" icon 52; see FIG. 2) and drop it the drop target "MCTY" (one of the country icons 59), the server would use the relation shown in FIG. 6 to connect the atoms and generate a listing of activities for that country. If the user had dragged the country icon 52 over the activity icon instead, the result would be a listing of activities by country or countries by activity.

Figure 7:
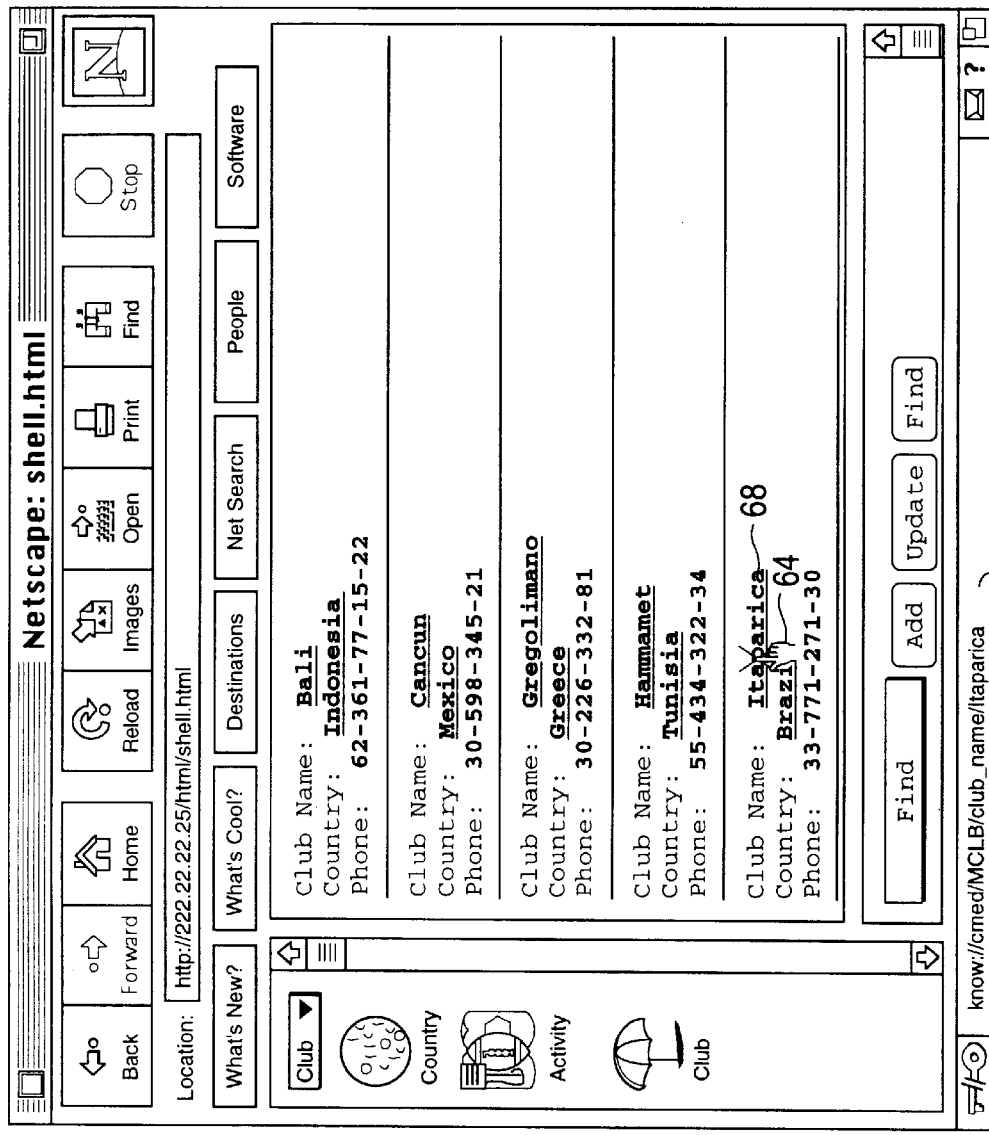
FIG. 7 is a screen display illustrating the process of clicking on an object under which meta-data is embedded.

Instead of dragging and dropping a meta-data link, the user can also single-click on the meta-data link. This is shown in FIG. 7, where the user has clicked cursor 64 on link 68. The meta-data is shown in status line 98. When clicked, the browser sends this URL to the Mediator plug-in for translation. The plug-in identifies the relevant atom and sends the message:

http://222.22.22.25/.MEDIATOR$*MEDIATOR*NST>
   /cmed/Atom/25012<cmed/MCLB/club_name/Itaparica to Web server 18. The Mediator plug-in follows the same steps as in the case of dragging and dropping of information into an atom. Since the object is of appropriate class for the atom, no translation is required, and the atom is served with the data clicked on.

Dragging is performed by holding the mouse button down, "picking up" the linked anchor or icon, positioning it over the preferred atom, and releasing the mouse button. After this action is performed, the browser will send a message to the client representing the logical action the user has just performed, where the action is dictated according to the embedded Know protocol meta-data. Each link under an atom includes a description of the atom's object type.

Registration and Correlation Services

The class relation matrix contains the relationships between classes created by the author. When two classes which need to be related are not created by a common author, the problem is more complicated, but is handled by the present invention.

The relation between two objects might be a direct one-to-one correlation or an indirect correlation between the two objects through an intermediary related object. In order to correlate object models, each author registers all or some of its objects with a registration server. Those registered objects may be registered as new object classes on this server model, or as related classes to currently registered classes. In the event a related class is registered, a correlation function is provided by the new class. This translation function may be bidirectional, providing a two-way translation between the new class and the existing class, or unidirectional. Registration servers operate under a separate protocol referred to herein as the YP (Yellow Pages) protocol which provides for registration, query, and management of registered entities. YP-based registration servers may be correlated through higher level YP servers to form a super-scalable structured web format.

In summary, the present invention provides for a new user-directed navigation metaphor. By allowing the user to drag and drop anchors onto a user-selected one of many drop targets, the present invention empowers a new more powerful navigation paradigm on the Web and other hypertext environments. Instead of the browser following pages based on the relationships set by the author of the page, the browser can follow pages based on the relationships indicated by the dragged object and the drop target. In a specific embodiment, an anchor includes embedded meta-data according to a description protocol referred to as the "Know" protocol, which is transparent to the user. The Know protocol allows web links to describe the data which contains the link, in contrast to usual protocols which describe the data to which the link is pointing.

The relationships between dragged elements and drop targets are stored in a matrix, a set of inter-object relation rules executed on the Web server where the dragged elements and the drop targets are objects in the model. The Web server creates new information pages on the fly for presentation to a browser modified according to the present invention. Typically, the modification is in the form of an add-on program or a plug-in.

To find the relationship between a dragged object and a drop target object, the Web server examines a matrix of relation rules. If the dragged object and dropped target object are not found in a common matrix, the class of those objects might be found to be registered at an object server which correlates registered classes from one server with registered classes from other servers. This allows from the relationships between objects to be maintained in a distributed manner.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

13

APPENDIX A

A. 1. Atom Find Template

```
<html>
<head>
<script language="JavaScript">
<!--
      function Load()
      {
            top.setMode("find") ;
      }
//  -->
</script>
    <title>Clubs</title>
</head>
<body onLoad="Load();">
<form name="InputForm">
Name<br>
<input type="text" name="MCLB:club_name"><br>
<i>Rating</i>
<hr>
<table width="400">
      <td>Comfort</td>
      <td>Family</td>
      <td>Total Capacity</td>
      <tr>
      <td>
            <select name="MCLB:comfort">
                  <option>
                  <option value="1">1
                  <option value="2">2
                  <option value="3">3
                  <option value="4">4
            </select>
      </td>
      <td>
            <select name="MCLB:familly">
                  <option>
                  <option value="1">1
                  <option value="2">2
                  <option value="3">3
            </select>
      </td>
      <td><input type="text" name="MCLB:capacity"></td>
      <tr>
</table>
<hr>
<i>Decription</i>
<TEXTAREA name="MCLB:desc" cols="40" rows="5" WRAP>
</TEXTAREA>
<hr>
<i>Location</i>
<hr>
      <input type="text" name="MCLB:country">
<hr>
      <input type="hidden" name="Button" value="Submit">
</form>
</body>
</html>
```

A.2. List Template

```
<html>
<head>
    <title>Club List</title>
```

```
</head>
<body>
<DBMATRIX=MCLB>
     Club Name: <b>
     <a href="know://cmed/MCLB/club_name/<DBFIELD=MCLB:club_name>">
<DBFIELD=MCLB:club_name></a>
     </b><br>Country: <b>
     <a href="know://cmed/MCTY/country/<DBFIELD=MCLB:country>">
<DBFIELD=MCLB:country></a>
     </b><br>Phone: <b>
     <DBFIELD=MCLB:phone></a>
     </b><br>
     <hr>
</DBMATRIX>
</body>
</html>
```

Appendix B - Protocol Definitions

The Know protocol describes object models, classes, object instances, properties and methods through a flexible naming scheme. Because every element in a KnowledgeWeb based system can be described through this protocol, the protocol provides for URL's for structured data elements instead of just for static pages or references to programs (CGI scripts, etc.).

B.1. BNF for Know protocol messages

```
<know_element>: 'Know://' [ host_id '/' ] <element>

<element>: <atom> | <data> | <action> | <query> | <method>

<atom>: <object_model_id> '/atom/' <atom_id>

<atom_id>: Long integer

<data>: <object_model_id> '/' <object_id> '/' <property_id> '/'
[ operand ] <property_value>

<object_model_id>: <token>

<object_id>: <token>

<property_id>: <token>

<operand>: '.' [ 'EQ' | 'GT' | 'GE' | 'LT' | 'LE' | 'NE' | 'IN' | 'IS' |
'CT' | 'NC' | 'SW' | 'ST' | 'EW' | 'CMN' | .... ]

<action>: <data> | ( <atom> [ '[' <mode> ']' ] [ '<' <data> ] )

<mode>: 'find' | 'browse' | 'add' | 'update'
    ; Mode 'browse' and 'update' require <data> for correct operation.
    ; If <data> is supplied, 'browse' is default mode.
    ; If <data> is not supplied, 'find' is default mode.

<query>: 'Mediator/Query/' <query_string>

<query_string>: <string>

<method>: <object_model_id> '/' <atom_id> '/' <method_name> '('
[ <parmeters> ] ')'

<parameters>: <param> [ ',' <parameters> ]

<param>: <token> | <string> | <data>

<token>: character sequence with no white space or linebreaks or '/'

<string>: character sequence starting and ending with '"'
```

16

B.2. BNF for Atom Descriptor File

<atom_descriptor_file>: [ <comment> ] <atom_toolbar> [ <CR> <atom_toolbar> ]

<atom_toolbar>: <toolbar_name> <CR> [ <atom_list> ]

<atom_list>: <atom_descriptor_line> <CR> [ <atom_list>]

<atom_descriptor_line>: <atom_id> <atom_name> <atom_server_host_id> <atom_URL> <atom_icon> <atom_main_obj>

<atom_id>: <integer>

<atom_name>: <token>

<atom_server_host_id>: tcp/ip address (255.255.255.255) | DNS name

<atom_URL>: Know protocol <atom> ( <object_model> '/atom/' <atom_name> )

<atom_icon>: <token>

<atom_main_obj>: <token>

<comment>: '//' <text_line>

<text_line>: character sequence with no linebreaks (<CR>)

<token>: character sequence with no white space or linebreaks or '/'

<integer>: any number between 1 and $2^{15}$

17

B.3. HTML Tags

`<DBFIELD fileCode=AlphaNumeric fieldAlias=AlphaNumeric [recNum=Numeric]>`

This tag will be replaced with the value of the field. The recNum parameter is optional, default value is 0.

`<DBMATRIX fileCode=AlphaNumeric>`

This tag will loop the records of the fileCode and repeat the HTML code inside the tag. DBFIELD tags within this tag will have their recNum updated automatically.

`</DBMATRIX>`

This tag marks the end of the repetition area for the <DBMATRIX> tag.

`<SET_QUERY input = fileCode  name=query_name string="DISPLAY fileCode fields... IF ....">`

This tag will set a query with a given name. If an input file is given, that input file will be used as input to the %? variables present in the query string. This tag can also be used inside a matrix, wherein the tag take the input (if an input file is needed) from the current record of the matrix.

`<QUERY name=query_name>`

This tag will loop the records of the query and repeat the HTML code inside the tag. `<QEFIELD ...>` tags and `<QUERY_ALL_FIELDS>` tags can be used within the repetitive HTML code.

`</QUERY>`

This tag marks the end of the repetition area for the <QUERY> tag.

`<QEFIELD fileCode=AlphaNumeric fieldName=AlphaNumeric fieldNumInQuery=Numeric [recNumInQuery=Numeric]>`

This tag should be embedded inside the <QUERY> tag. This tag will be replaced with the value of the field from the query. The *fieldNumInQuery* parameter indicates which field is to be taken from the query. The *fileCode* and *fieldName* parameters indicate the original (*fileCode*, *fieldNum*) pair which defines the field in the query.

`<QUERY_ALL_FIELDS>`

This tag should be embedded inside the <QUERY> tag. This tag will loop all the fields in the current record in query HTML code in which it is embedded in and repeat the HTML code inside the tag for each field. `<QUERY_REPEAT_FIELD>` tags should be used.

`</QUERY_ALL_FIELDS>`

This tag marks the end of the repetition area for the `<QUERY_ALL_FIELDS>` tag.

`<QUERY_REPEAT_FIELD value | name | descr | file>`

18

This tag should be embedded inside the <QUERY_ALL_FIELDS> tag. This tag will be replace with the value or name or description or file code of the current field of the query.

<ME_INPUT varName=inputVariableName>

This tag will be replaced by the server with the value of the HTML variable which name is given here. The variable is of the HTML document which referred to the one being constructed.

What is claimed is:

1. A hypertext browser which displays hypertext pages referencing other hypertext pages comprising:

means, within the hypertext browser, for indicating one or more draggable element of a page being viewed;

means for displaying one or more drop target on a user display, either within a browser window or outside the browser window;

means for detecting an event when a user selects a selected draggable element and drops the selected draggable element over a selected drop target; and means, coupled to the means for detecting, for generating a message which is a function of the selected draggable element and the selected drop target wherein the message is formatted to resolve to a referenceto a new hypertext page to be generated and viewed in response to the event.

2. The hypertext browser of claim 1, wherein objects in an object model which have at least one input are objects which are potential drop targets, objects which have at least one output are potential draggable elements, and objects which have at least one input and at least one output are potential draggable elements and potential drop targets.

3. The hypertext browser of claim 1, further comprising means for navigating to a new location in a hypertext document or hypertext server web based on the generated message.

4. The hypertext browser of claim 1, wherein the draggable element is a text string on the page being viewed.

5. A hypertext system for displaying hypertext pages comprising:

a hypertext browser, comprising:

means, within the hypertext browser, for indicating one or more draggable element of a page being viewed;

means for displaying one or more drop target on a user display, either within a browser window or outside the browser window;

means for detecting an event when a user selects a selected draggable element and drops the selected draggable element over a selected drop target; and means, coupled to the means for detecting, for sending a message to a hypertext server in response to the events wherein the message references the selected draggable element and the selected drop target; and the hypertext server comprising:

means for receiving messages from hypertext browsers;

a matrix of class relations having a cell for each combination of a draggable element reference and a drop target reference;

means, coupled to the means for receiving and the matrix, for identifying a cell in the matrix for the selected draggable element and the selected drop target indicated by a received message; and means, coupled to the means for identifying, for performing an action which is a function of contents of the cell.

6. The hypertext system of claim 5, wherein the action performed by the hypertext server is an action of returning a hypertext page to the hypertext browser.

7. The apparatus of claim 5, further comprising an object model server for providing a class relation for the selected draggable element and the selected drop target where the cell in the matrix at the hypertext server indicates that the relation between the selected draggable element and the selected drop target is not stored local to the hypertext server.

8. The apparatus of claim 5, further comprising an object reference server and means for querying the object reference server to obtain an object-to-object relationship between the draggable element and the selected drop target when either the draggable element or the selected drop target are not found in the class relation matrix.

9. A method of navigating in a hypertext system, wherein navigation includes a process of moving from hypertext page to hypertext page in response to user input, the method comprising the steps of:

a) displaying an initial hypertext page with at least one draggable element thereon;

b) detecting the user dragging the draggable element to coincide with a drop target;

c) detecting a release event, wherein the draggable element coincides with the drop target and the user signals a release;

d) generating a reference to a subsequent hypertext page where the reference is determined from the draggable element and the drop target; and e) displaying the subsequent hypertext page.

10. The method of claim 9, wherein the step of dragging the draggable element is a step of dragging a text phrase.

11. The method of claim 9, further comprising the steps of:

f) displaying at least one subsequent draggable element on the subsequent hypertext page; and g) repeating steps b) through e) in response to user input.

12. The method of claim 9, wherein the step of generating a reference comprises the steps of:

locating a cell in a matrix where the cell is pointed to by the draggable element and the drop target;

generating a reference from the contents of the located cell; and when the contents of the located cell includes an external reference, resolving the external reference.

\* \* \* \* \*